United States Patent [19]

LeGrand et al.

[11] 4,040,882

[45] Aug. 9, 1977

[54] PRIMER COMPOSITION, COMPOSITE AND METHOD FOR MAKING THE SAME

[75] Inventors: Donald G. LeGrand, Burnt Hills; Gina G. Vitale, Saratoga Springs, both of N.Y.

[73] Assignee: General Electric Company, Schenectady, N.Y.

[21] Appl. No.: 618,474

[22] Filed: Sept. 29, 1975

[51] Int. Cl.$^2$ .................... C03C 27/04; C32B 17/10; C07F 7/02

[52] U.S. Cl. .................................. 156/106; 156/329; 260/448.2 E; 260/448.2 N; 428/412; 428/429

[58] Field of Search .............. 156/102, 106, 308, 329; 428/420, 391, 412; 260/448.2 E, 448.2 N

[56] References Cited

U.S. PATENT DOCUMENTS

| | | | |
|---|---|---|---|
| 2,832,754 | 4/1958 | Jex ......................................... | 260/824 |
| 3,189,662 | 6/1965 | Vaughn ................................ | 260/824 |
| 3,306,800 | 2/1967 | Plueddeman ......................... | 156/329 |
| 3,549,590 | 12/1970 | Holdstock et al. ................. | 260/448.2 |
| 3,650,808 | 3/1972 | Gagnon ................................. | 428/412 |
| 3,702,794 | 11/1972 | Hartlein ................................. | 156/329 |
| 3,740,305 | 6/1973 | Holback et al. ...................... | 156/329 |
| 3,754,971 | 8/1973 | Pope et al. ............................ | 156/329 |

*Primary Examiner*—Charles E. Van Horn
*Assistant Examiner*—Michael W. Ball
*Attorney, Agent, or Firm*—William A. Teoli; Joseph T. Cohen; Jerome C. Squillaro

[57] ABSTRACT

A primer composition is provided in the form of an aqueous-alcoholic reaction product of an amino alkyl polyalkoxysilane and an alkyl carbonate. There is also provided a composite of an organo silicon-polycarbonate block copolymer and a glass substrate, and a method for making such composite involving the treatment of the glass substrate with the above described primer composition.

10 Claims, No Drawings

PRIMER COMPOSITION, COMPOSITE AND METHOD FOR MAKING THE SAME

The present invention relates to a primer composition in the form of an aqueous-alcoholic reaction product of an amino alkyl polyalkoxysilane and an alkyl carbonate. More particularly, the present invention relates to the use of such primer composition for treating a glass substrate to provide improved bond strength between such glass substrate and an organosilicon-polycarbonate block copolymer.

Prior to the present invention organosilicon-polycarbonate block copolymers, such as described in Vaughn U.S. Pat. No. 3,189,662, Merritt U.S. Pat. No. 3,832,419, Merritt et al U.S. Pat. No. 3,821,325 and copending application of Niznik et al Ser. No. 442,863, filed 02/15/74, all assigned to the same assignee as the present invention, was used in a variety of applications including its use as an interlayer between a glass substrate and another substrate, such as a glass or a thermoplastic sheet to provide for a reinforced laminate structure. Although the utility of such organosilicon-polycarbonate block copolymers provided for a variety of useful applications in the reinforced laminate area, one of the problems which developed was that the bond strength between the organosilicon-polycarbonate copolymer and the glass substrate was often insufficient for particular uses.

Subsequently, a primer composition was developed as shown in the copending application Ser. No. 428,610, filed Dec. 26, 1973, of LeGrand et al, to achieve improved bond strength between the glass substrate and the organosilicon-polycarbonate block copolymer. Although valuable results were achieved by the use of such primer composition, it was found that under uncontrolled atmospheric conditions impurities, such as allyl chloride, acetic acid, methanol, water vapor and ammonia, often present in the air around chemical manufacturing plants, detrimentally affected the performance of the primer. As a result, a substantial reduction in the bond strength between the glass substrate and the organosilicon-polycarbonate copolymer often was effected reducing the utility of such composite.

The present invention is based on the discovery that if the above described primer composition, which is in the form of a reaction product of water and an amino alkyl polyalkoxysilane in methanol, is replaced with a primer composition in the form of an aqueous-alcoholic reaction product of an amino alkyl polyalkoxysilane and an alkyl carbonate, improved resistance to atmospheric contaminents is achieved when used to make the above described composite. Experience also has shown that improved bond strength is achieved between the glass substrate and the organosilicon-polycarbonate copolymer and the ability of the resulting composite to resist delamination over an extensive period of time is substantially increased.

There is provided by the present invention, a primer composition in the form of the equilibrated reaction product at temperatures in the range of between 5° C to 50° C of
  A. water
  B. a $C_{(1-8)}$ alkanol, and
  C. the reaction mixture at temperatures in the range of between 0° C to 90° C of 1 to 3 moles of an amino alkyl polyalkoxysilane per mole of a difunctional organic compound selected from the class consisting of diorganocarbonates and diorganosulfoxides, where there is employed in such equilibrated reaction product on a volume basis, from 0.5 to 10 parts of (A), and from 0.5 to 10 parts of (C) per 100 of (B).

Included by the above described $C_{(1-8)}$ alkanols which can be employed in the primer composition are, for example, methanol, ethanol, propanol, butanol, etc. Among the difunctional organic compounds are preferably dialkyl carbonates which include, for example, dimethyl carbonate, diethyl carbonate, dipropyl carbonate, etc. However, diaryl carbonates, such as diphenyl carbonate, can be used as well as sulfoxides, such as dimethyl fulfoxides, diethyl sulfoxide, etc. Preferably, the amino alkyl polyalkoxy-silane which is used is γ-aminopropyl triethoxy silane. However, other alkyl polyalkoxysilanes can be used, such as γ-aminopropyl trimethoxy silane, N, β-(aminoethyl)-γ-aminopropyl triethoxy silane, etc.

In making the above described primer composition, a mixture of the amino alkyl polyalkoxysilane and the dialkylcarbonate can be made and agitated and allowed to stand at room temperature for about 0.5 to 24 hours. The alkanol then can be combined with the resulting reaction product. Water then can be added to a solution of the above described reaction product of the dialkylcarbonate and the aminoalkyl polyalkoxysilane in alcohol. After the water has been added, the mixture is stirred and the resulting mixture is allowed to stand for 18 to 24 hours or more to achieve an equilibrium condition. Although it is not completely understood what reactions take place in the formation of the primer composition of the present invention, one explanation is that a urethane, or a urea can be formed during the initial period of contacting and mixing the amino alkyl polyalkoxysilane and the dialkylcarbonate. A further explanation of the primer performance is that when water is added to the aforementioned reaction product along with the alcohol, that reactive silanol intermediates are formed which also achieve an equilibrium condition after the mixture is allowed to stand for an extended period of time.

In addition to the dialkylcarbonates, there also can be employed in the practice of the present invention compounds, such as acid halides, esters, and anhydrides of carboxylic acids, such as acetyl chlorides, methyl acetate, and acetic anhydride which can be used in combination with a sufficient amount of acid acceptor to combine with any byproduct acid formed during the initial contact between the amino alkyl polyalkoxy silane and the carboxylic acid derivative.

Another feature of the present invention is to use of the primer composition to treat a glass substrate to improve the bonding characteristics between the resulting treated substrate and the organosilicon-polycarbonate block copolymer. The organosilicon-block copolymers a described by the above mentioned patents can be made by effecting reaction between a halogen terminated polydiorganosiloxane having from 2 to 200 organosiloxy units, such as methylsiloxy units and a dihydric phenol, for example, bisphenolA, hydroquinone, resorcinol, etc., or other dihydric phenols described in the above mentioned Vaugn patent. There can be utilized in the initial reaction mixture of dihydric phenol and halogen-terminated polydiorganosiloxane, a substantially equal molar mount of dihydric phenol and halogen-terminted polydiorganosiloxane in the presence of an acid acceptor to produce an organosilicon oligomer which is in the form of a copolymer of alternating chemically combined units derived from the dihydric phenol and the halogen terminated polydiorganosiloxane. However, if desired, excess dihydric phenol can also be used to modify the characteristics of the oligomer to where the resulting mixture can consist of polydiorganosilxane having terminal dihydric phenol units along with excess dihydric phenol. When the aforementioned mixture, which can be either in the form of oligomer, and dihydric phenol, or dihydric phenol terminated polydiorganosiloxane along with excess dihydric phenol is phosgenated, the phosgenation of such mixture results in the production of the organosilicon-polycarbonate block copolymer employed in the production of the composite of the present invention.

The composite of the present invention can be in the form of a glass substrate, such as a glass panel, glass cloth, etc., in contact with the polydiorgano-siloxane-polycarbonate block copolymer in the form of a stiff panel, rubbery sheet, woven cloth, etc. Preferably, the composite is in the form of a 5 ply laminate consisting of a thermoplastic polymer ply, such as a polycarbonate sheet between two polydiorganosiloxane-polycarbonate block copolymer plies bonded to exterior glass plies or a 3 ply assembly of exterior glass plies and an interior polydiorganosiloxane-polycarbonate block copolymer ply. In addition, combinations of more than 3 plies can include layers of other high performance polymeric materials, such as sheets of polyamides, polyphenyleneoxides, etc.

Application of the primer solution to the glass substrate can be achieved by the use of various means, such as a roller coater, a curtain coater, painting, spraying, etc., at a temperature in the range of between 20° C to 120° C. Upon evaporation of volatiles from the primed glass substrate, the organosilicon-polycarbonate block copolymer in the form of a sheet or as a cover for other polymeric materials can be applied directly between two primed glass substrates. The assembly can then be heated to a temperature of from 120° C to 150° C, while applying a pressure of from 15 psi to 200 psi. After a period of from 10 to 45 minutes a sufficient bonding of the organosilicon-polycarbonate block copolymer to the glass substrates can be achieved.

In order that those skilled in the art will be better able to practice the invention, the following examples are given by way of illustration and not by way of limitation. All parts are by volume.

EXAMPLE 1

A solution was prepared consisting of one mole of dimethylcarbonate and 1.1 mole of γ-aminopropyl triethoxy silane. This solution was stirred for 30 minutes and then allowed to stand for 3 days. Based on the method of preparation the resulting mixture was reaction product of the dimethylcarbonate and the γ-aminopropyl triethoxy silane having urea linkages. The presence of the urea was confirmed by IR spectra.

A mixture of 50 parts of the above urea reaction product and 1000 parts of methanol was stirred thoroughly. There was then added to the mixture about 10 parts of water to produce a solution which also was thoroughly stirred. There was obtained a solution which was allowed to stand for 24 hours. Based on method of preparation, the mixture was a silanol-containing reaction product of water, methanol and the above urea-containing reaction product.

A clean, 125 mil thick glass panel which had been heated to 120° F in an oven was coated while still hot with the above primer solution at room temperature using a sponge, the primer drying to the thickness of the order of 400A which is not critical. The heated glass plate was allowed to cool to room temperature and a 30 mil thick sheet of block polysiloxane-polycarbonate copolymer, specifically General Electric LR-3320, was placed on the dried primed glass surface. A second unprimed sheet of glass plate similar to the above was placed on top of the block copolymer, the laid up structure being placed in a stream hydraulic press at 150° F with the pressure being raised after entry to 200 psi. The press was then heated to 293° F and held for 10 to 15 minutes. The heat source was then turned off and water used to cool the laminate to room temperature. Next, the unprimed glass plate was removed from the laminate and 1-inch wide strips cut from the remaining block copolymer-glass laminate. There was obtained a composite of polydimethylsiloxane-polycarbonate and glass having a peel test adhesion value of from 28-38 pounds per inch of width.

The polysiloxane-polycarbonate block copolymers within the scope of this example can be expressed by the average formula:

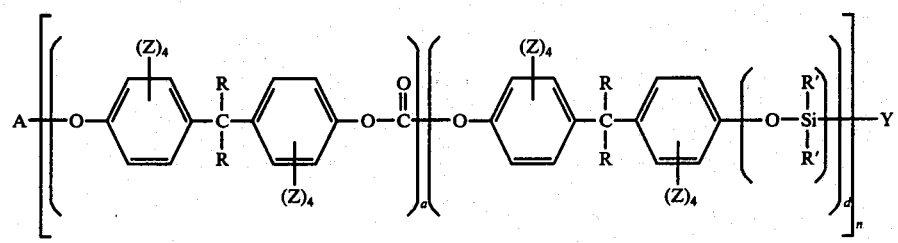

where $n$ is at least 1, and preferably $n$ is an integer equal to from 1 to about 1000, inclusive, $a$ is equal to from 1 to about 200, inclusive, $b$ is equal to from about 5 to about 200, inclusive, and preferably $b$ has an average value from about 15 to about 90, inclusive, while the ratio of $a$ to $b$ can vary from about 0.05 to about 3, inclusive, and when $b$ has an average value of from about 15 to about 90, inclusive, the ratio of $a$ to $b$ is preferably from about 0.067 to about 0.45, inclusive, and $d$ is 1 or more, Y is

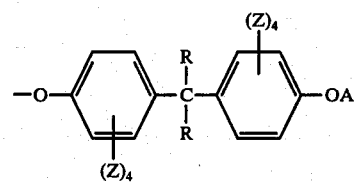

A is a member selected from the class of hydrogen and

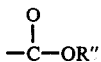

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the glass consisting of monovalent hydrocarbon radicals and halogenated hydrocarbon radicals, and Z is a member selected from the class of hydrogen, lower alkyl radicals and halogen radicals and mixtures thereof.

Included within the radicals represented by R of Formula 1 are aryl radical and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, R' includes all radicals included by R above except hydrogen, where R' can also be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc. radicals. Radicals that are included within the definition of Z of Formula 1 are hydrogen. methyl, ethyl, propyl, chloro, bromo, iodo, etc. and combinations there of, and Z is preferably hydrogen.

The hydrolytically stable copolymers can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10 percent to about 75 percent of said polydiorganosiloxane, and preferably from about 40 to 70 percent by weight.

The copolymers of Formula 1 can be produced by reacting at temperatures in the range of 0° C to 100° C, preferably 20° C to 50° C, and in the presence of an acid acceptor, a mixture of a halogen chain-stopped polydiorgano-siloxane having the formula

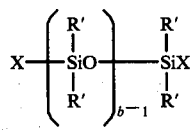

and a dihydric phenol having the formula

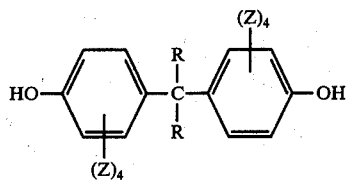

and thereafter phosgenating said reaction product until the resulting copolymer achieves a maximum intrinsic viscosity, where R, R', Z and $b$ are as defined above, and X is a halogen radical, preferably chloro.

The halogen chain-stopped polydiorganosiloxanes of Formula 2 can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35 percent, by weight, and preferably from about 1 to about 10 percent by weight of said halogen chain-stopped polysiloxane. The halogen chain-stopped polysiloxane is preferably in the form of a chlorinated polydimethylsiloxane.

Dihydric phenols that are included in Formula 3 are, for example, 2,2-bis(4-hydroxyphenyl)-propane (bisphenol-A); 2,4'-dihydroxydiphenylmethane; bis-(2-hydroxyphenyl)-methane; bis-(4-hydroxyphenyl)-methane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl-propane; 2,2-bis-(3-isopropyl-4-hydroxyphenyl)-propane, etc. Mixtures can also be used. Others will occur to those skilled in the art.

The copolymers essentially comprise recurring units consisting of a polydiorganosiloxane interconnected by substituted aryloxy-silicon linkages to a polyester of carbonic acid precursor and a dihydric phenol.

Materials of the above nature are also described in U.S. Pat. No. 3,189,662 included herein by reference and can be used either alone as such or in conjunction with well known modifiers to provide particular desired characteristics. Typical of such block copolymers are General Electric LR-3320. This material has a specific gravity of 1.12, a tensile strength of 2600 to 3200 psi, an elongation of 300 to 390, a tear strength (Die C) of 400 lbs/in., a brittleness temperature below −76° F, and a heat deflection temperature (10 mils under 66 psi load) of 160° F. Also useful is General Electric LR-5630 block copolymer which has a specific gravity of 1.07, a tensile strength of 2200 to 2500 psi, an elongation of 500–700 percent, a tear (Die C) of 200 lbs./in., and a brittle temperature below −76° F, and a heat deflection temperature (66 psi) of 130° F.

EXAMPLE 2

There was added 2.2 moles of γ-aminopropyl triethoxy silane to 1 mole of dimethylcarbonate. The resulting solution was stirred for 30 minutes at room temperature and for 1 hour at 60° C.

A primer was prepared by stirring thoroughly 50 parts of the above mixture with 1000 parts of methanol. There was then added 10 parts of water to the resulting mixture. The resulting mixture was then allowed to stand 24 hours to achieve an equilibrium condition. Based on method of preparation the primer was a silanol-containing reaction product having urea linkages of γ-aminopropyl triethoxy silane, dimethylcarbonate, methanol and water.

A composite of glass and a polydimethylsiloxane was prepared as described in Example 1. A peel test value of 20-25 lbs/in was obtained. The peel test used was designed to measure the adhesion between a flexible substrate and a rigid substrate. A peel test value of at least 15 lbs/in is acceptable. Strips of composite 1 inch wide were used.

One end of the flexible sheet is held in a clamp and the whole strip mounted on a peeling jig afixed to an Instron tensile testing machine. As the machine's crosshead descends, the clamp remains stationary, the substrate is peeled, the jig maintains the angle of the peeled sheet to the substrate at 90°, and the force to peel the substrate is recorded by the chart. The peel value is reported in pounds per inch width of the strip.

EXAMPLE 3

An asymmetric composite was prepared in accordance with Example 1. A 12 × 12 inches panel of glass was primed with the equilibrated composition. There was then placed a sheet of block copolymer on the primed glass followed by a sheet of polycarbonate, then a sheet of block copolymer followed by another panel of unprimed glass.

Another asymmetric composite was prepared following the same procedure, except the glass was primed with the composite of the above mentioned copending application of LeGrand et al Ser. No. 428,610 using from 0.5 to 10 percent by volume of γ-aminopropyl triethoxy silane, from about 0.5 to 10 percent water by volume and the balance methanol.

Both assemblies were heated to 145° C under 120 psi for 45 minutes. When the unprimed glass was removed, both laminates were convex with the glass inside. These laminates were then subjected to mechanical flexing. They were placed between steel plates in an Instron tensile testing apparatus and the machine was adjusted to move the plates together, thus flattening the laminates, 150 times per hour. After 1900 flex cycles, the laminate made with the primer of Ser. No. 428,610 showed areas of delamination; the laminate made with the primer of the present invention was unchanged. Pummel tests were then done on the two lamintes. In this test, the glass surface is hammered away and the amount of glass remaining on the copolymer surface is observed and quantified. A pummel value of 0 indicates no glass adhering to the copolymer; 10 indicates that the copolymer is still covered everywhere with glass. For these two laminates, the one made with the primer of the present invention had a pummel value of 9-10, while the laminate made with Ser. No. 428,610 primer had a value of 0-1.

EXAMPLE 4

A piece of glass was primed as in Example 1 with the composition described there. On the primed glass was placed a sheet of block copolymer followed by a sheet of nylon and then a piece of unprimed glass. A second composite was assembled in the same way except the primer used was that of the above mentioned copending application, Ser. No. 428,610.

The two laminates were placed into a vacuum bag which was then placed in a hot autoclave, and thereafter a 100 psi air pressure is applied. The laminates were heated at 293° F for 30 minutes. The laminate using the primer of the present application had a peel value of 43.9 lb/in of width. That using the primer of Ser. No. 428,610 had an adhesion value of only 13.7 lbs. per inch of width.

Although the above examples are limited to only a few of the variables applicable to the compositions, methods and articles within the scope of the present invention, it should be understood that the scope of the present invention can be further appreciated by the description preceeding these examples. Accordingly, those skilled in the art would know that the time to achieve equilibrium conditions in making the primer solution can vary widely depending upon the degree of agitation, temperature, etc. In addition, temperatures and pressures such as 100° to 200° C and 15 to 200 psi can be used when contacting the polydiorganosiloxane-polycarbonate copolymer to the primed glass substrate, etc. Those skilled in the art would also know that the composites of the present invention can be used as safety glass which is resistant to heavy blows and missiles without failure as by delamination or spalling of the structure.

What we claim as new and desire to secure by Letters Patent of the United States is:

1. A primer composition in the form of the equilibrated reaction product of
   A. water
   B. a $C_{(1-8)}$ alkanol, and
   C. the reaction mixture at temperatures in the range of between 0° C to 90° C of 1 to 3 moles of an amino alkyl polyalkoxysilane per mole of a diorganocarbonate,
   where there is employed in such equilibrated reaction product on a volume basis, from 0.5 to 10 parts of (A), and from 0.5 to 10 parts of (C) per 100 parts of (B).

2. A reaction product in accordance with claim 1, where the aminoalkyl polyalkoxysilane is γ-aminopropyl triethoxy silane.

3. A reaction product in accordance with claim 1, where the alkanol is methyl alcohol.

4. A reaction product in accordance with claim 1, where the dialkylcarbonate is dimethylcarbonate.

5. A method for making a multi-ply composite which comprises heating to an elevated temperature an assembly of at least two plies comprising a glass substrate and a polydiorganosiloxane-polycarbonate block copolymer, while subjecting such assembly to a pressure of at least about atmospheric which is sufficient to insure substantially uniform contact between the plies, where the glass substrate has been primed with a composition in the form of the equilibrated reaction product of
   A. water
   B. a $C_{(1-8)}$ alkanol, and
   C. the reaction mixture at temperatures in the range of between 0° C to 90° C of 1 to 3 moles of an amino alkyl polyalkoxysilane per mole of a diorganocarbonate,
   where there is employed in such equilibrated reaction product on a volume basis, from 0.5 to 10 parts of (A), from 0.5 to 10 parts of (C) per 100 parts of (B).

6. A method for making a five ply composite in accordance with claim 5, consisting of two exterior glass plies, two interior polydiorganosiloxane-polycarbonate block copolymer plies and a middle polycarbonate ply in contact with such polydiorganosiloxane-polycarbonate plies.

7. A method in accordance with claim 5, where the block copolymer is a polydimethylsiloxane-polycarbonate.

8. A method in accordance with claim 5, where the aminoalkyl polyalkoxysilane is γ-aminopropyl triethoxy silane.

9. A three poly composite made in accordance with the method of claim 5, consisting of two exterior glass plies, and a middle polydimethylsiloxane-polycarbonate block copolymer ply.

10. A method in accordance with claim 5, where the difunctional organic compound employed in making the primer composition is dimethyl carbonate.

* * * * *